Figure 1:
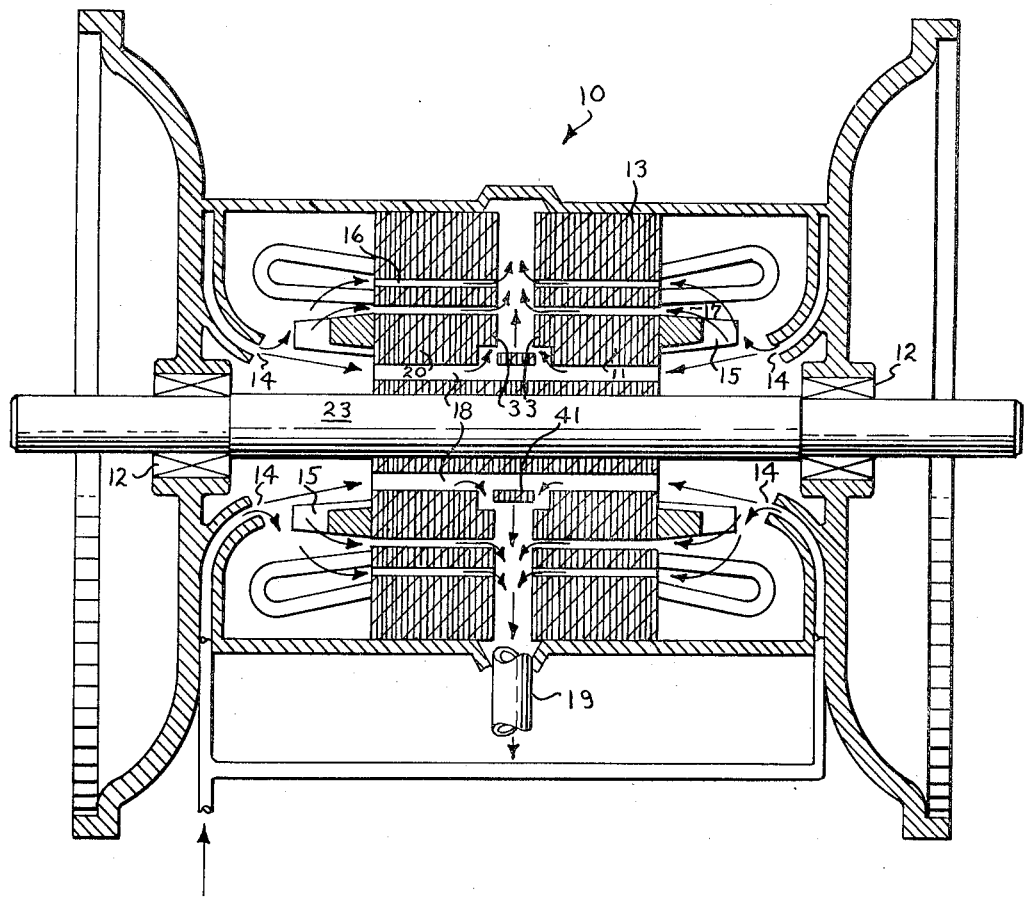

United States Patent

Lenz

[15] 3,684,906
[45] Aug. 15, 1972

[54] CASTABLE ROTOR HAVING RADIALLY VENTING LAMINATIONS

[72] Inventor: Henry George Lenz, Scotia, N.Y.
[73] Assignee: General Electric Company
[22] Filed: March 26, 1971
[21] Appl. No.: 128,393

[52] U.S. Cl. ..................................... 310/61, 310/64
[51] Int. Cl. ............................................. H02k 9/06
[58] Field of Search ..................... 310/61, 64, 65, 212

[56] References Cited

UNITED STATES PATENTS

| 890,577 | 6/1908 | Richards | 310/61 X |
| 1,487,221 | 3/1924 | Ehrmann | 310/64 X |

FOREIGN PATENTS OR APPLICATIONS

| 1,302,267 | 7/1962 | France | 310/61 |

Primary Examiner—D. X. Sliney
Attorney—John J. Kissane, James C. Davis, Jr., Frank L. Neuhauser, Oscar B. Waddell and Joseph B. Forman

[57] ABSTRACT

A rotor is described having ventilating laminations of a configuration permitting casting of the rotor conductors without blocking radially venting passages in the rotor. To effect this result, the triple cage conductor slot configuration of the main rotor laminations is altered in the venting laminations to a coffin shaped slot of equal area thereby providing a greater span between conductor slots for venting slots extending radially between, and separated from, the coffin shaped conductor slots. A kidney shaped manifold serves to communicate the venting slots with circular refrigerant passageways extending laterally through the rotor while a second group of ventilating laminations having radially disposed venting slots partially overlapping the venting slots of the first ventilating laminations permits radial discharge of refrigerant into the rotor air gap.

11 Claims, 6 Drawing Figures

INVENTOR.
HENRY G. LENZ

PATENTED AUG 15 1972 3,684,906

SHEET 3 OF 3

CASTABLE ROTOR HAVING RADIALLY VENTING LAMINATIONS

This invention relates to a castable rotor having radially ventilating laminations and, in particular, to a rotor having laminations with venting slots extending centrally between and separated from the conductor slots to permit casting of the rotor conductors.

In the design of rotors for large dynamoelectric machines, it generally is desirable to provide some ventilation scheme to permit sustained operation of the motor at rated output without inordinate heating. Adequate ventilation is particularly important in hermetic motors wherein excessive heat generated at any location within the motor can physically degrade refrigerant flowing therethrough. Moreover, more efficient motor performance and operation at higher speeds generally are attainable with enhanced cooling of the motor.

Among techniques heretofore proposed for cooling rotors of dynamoelectric machines is the utilization of ventilating laminations having radial slots extending over an arcuate span encompassing the rotor conductors. For example, the ventilating laminations disclosed in U.S. Pat. No. 890,677 characteristically possess long narrow teeth which extend between the rotor conductors to form radial venting slots for refrigerant flow and the refrigerant passes in direct communication with the rotor conductors. While such design is suitable for rotors formed by insertion of prefabricated bars into stacked laminations, casting of the rotor conductors, (e.g., using techniques disclosed in U.S. Pat. No. 2,807,844 assigned to the assignee of the present application) cannot be accomplished without molten metal flowing into the venting slots to block subsequent passage of the refrigerant therethrough.

In order to overcome this difficulty, various ventilation techniques have been proposed for utilization with cast rotor conductors. For example, radial ducts have been drilled between rotor conductors subsequent to casting to provide refrigerant passageways within the rotor. Similarly, weld pieces have been secured along the periphery of conductor slots in selected laminations to space apart adjacent rotor laminations prior to casting while confining the molten metal within the conductor slots during casting. Other techniques also employed to permit radial venting of cast rotors is the insertion of spacer blocks between laminations prior to casting with the subsequent removal of these blocks providing radially extending passageways for fluid refrigerant. Rotors also have been cast as dual units with ventilating space being provided between units when the units are subsequently joined in a back-to-back configuration by interconnection of the rotor bars protruding from each unit. Each of the foregoing ventilating techniques, however, typically add an additional step to the fabrication of the rotor thereby increasing the economic cost of the rotor. Moreover, rotors formed in accordance with the foregoing techniques often are mechanically weak at the location of the radial ventilating passages.

It is therefore an object of this invention to provide a rotor characterized by ventilating laminations permitting casting of the rotor conductors.

It is also an object of this invention to provide a castable rotor which can be fabricated inexpensively with a minimum of steps.

It is a still further object of this invention to provide an easily fabricated, mechanically strong ventilated rotor.

These and other objects of this invention generally are achieved in a rotor having ventilating laminations characterized by venting passages extending radially between and physically separated from conductor slots within the ventilating laminations. Thus, a rotor in accordance with this invention would include an axial shaft having a plurality of magnetic laminations stacked in registration thereon to provide axially extending conductor slots at arcuately spaced locations along the rotor periphery. An axial channel extends at least partially through the rotor and at least one magnetic lamination having venting slots in communication with the axial channel is located along the rotor length. Characteristically, the venting slots extend radially between and are physically separated from the conductor slots within the ventilating lamination to permit casting of the rotor conductors without blocking the venting slots and the geometric configuration of the conductor slots in the ventilating laminations differs from the geometric configuration of the conductor slots in the non-venting rotor laminations to provide a greater area between adjacent slots of the ventilating laminations for the venting slots.

Figure 2:
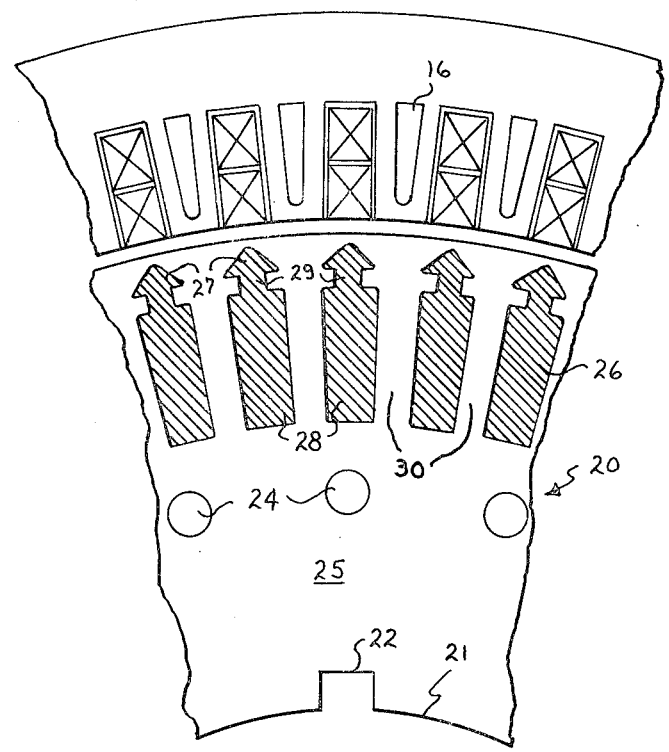
Figure 3:
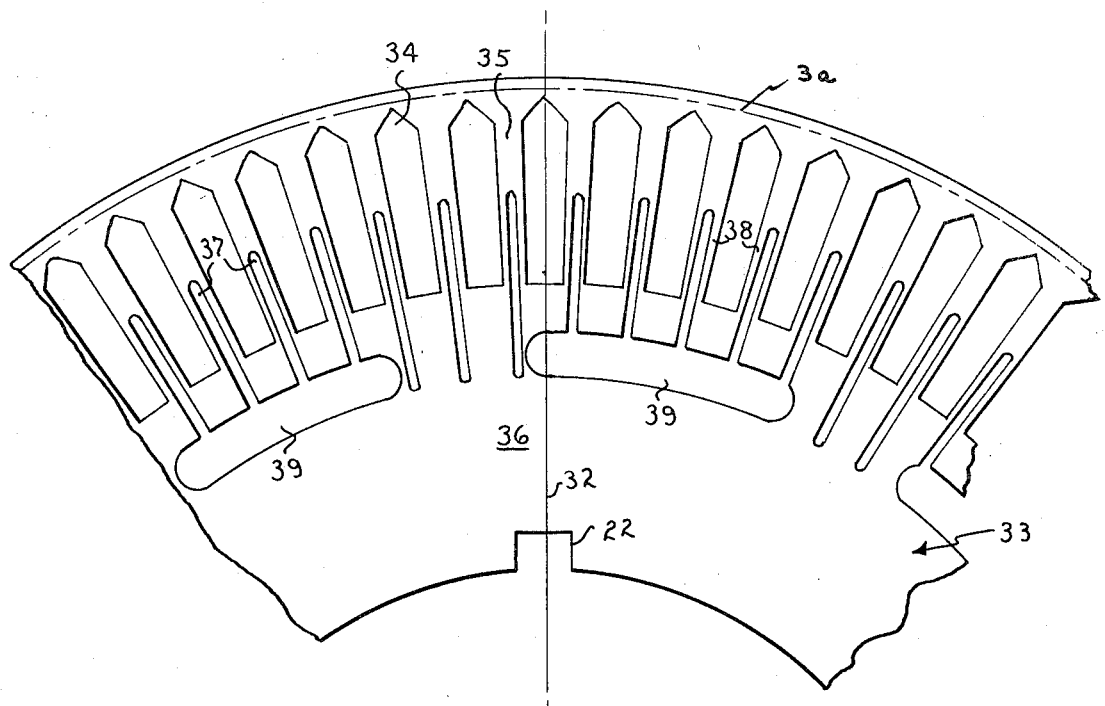
Figure 4:
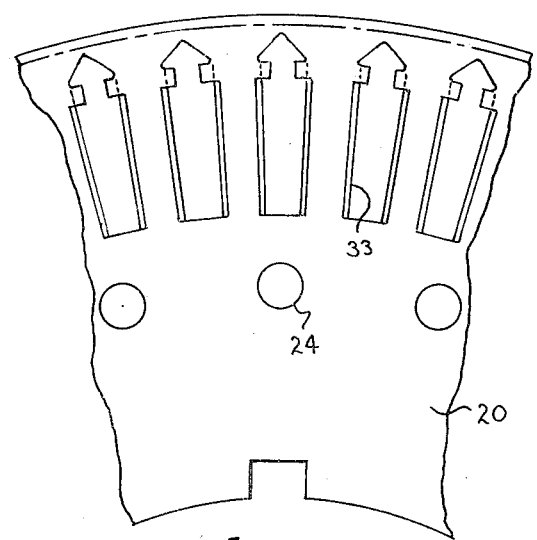
Figure 5:
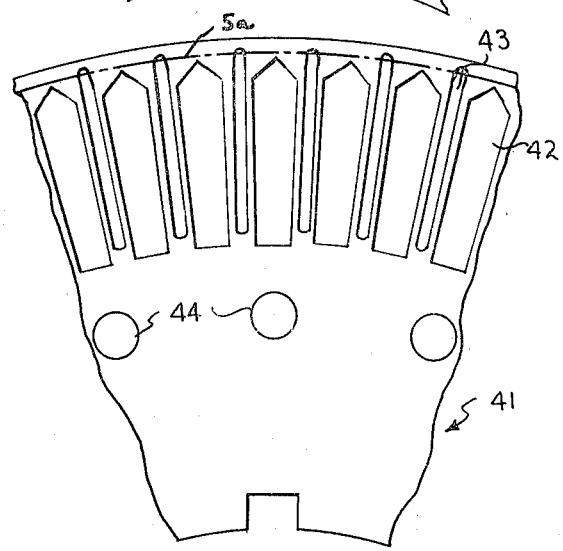
Figure 6:
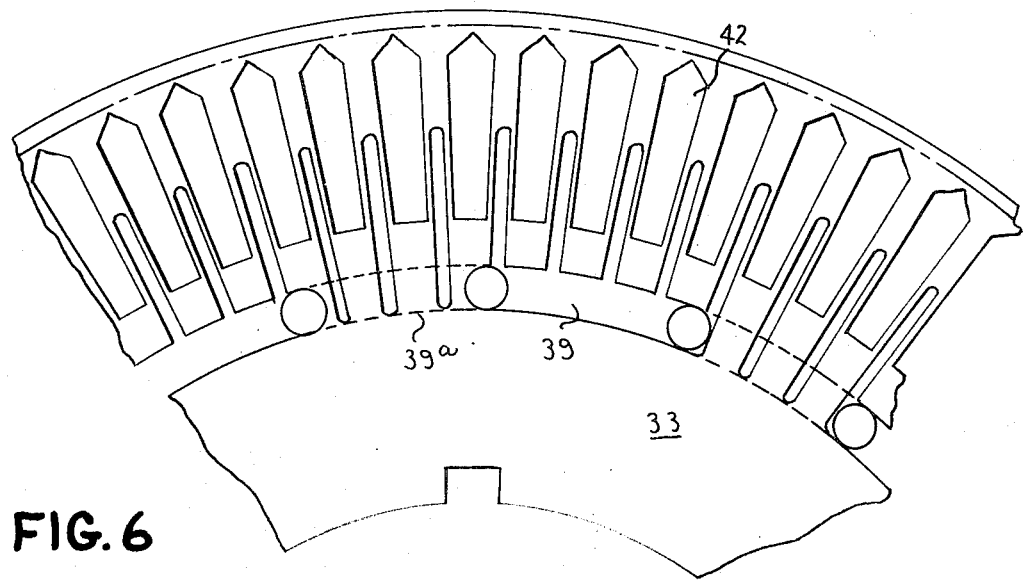

Although the invention is described with particularity in the appended claims, a more complete understanding of this invention can be obtained from the following detailed description of a preferred specific embodiment taken in conjunction with the attached drawings wherein:

FIG. 1 is a sectional view of a hermetic motor having a radially ventilated rotor in accordance with this invention, FIG. 2 is a broken-away plan view of a main rotor lamination within the hermetic motor, FIG. 3 is a broken-away plan view illustrating an unshaved ventilating lamination in accordance with this invention, FIG. 4 is a broken-away plan view illustrating the superposition of unshaved laminations illustrated in FIGS. 2 and 3, FIG. 5 is a broken-away plan view illustrating an unshaved ventilating lamination employed to communicate the ventilating lamination of FIG. 3 with the motor air gap, and FIG. 6 is a broken-away plan view illustrating the arcuate displacement of the kidney shaped manifolds within ventilation laminations situated on opposite sides of the rotor center.

A hermetic motor 10 formed in accordance with this invention is illustrated in FIG. 1 and generally comprises a rotor 11 axially supported at opposite ends by bearing 12 for rotation within the cylindrical cavity formed by stator 13. During operation, typically a liquid refrigerant, e.g., FREON 11, is admitted to the motor through orifices 14 disposed adjacent opposite ends of the rotor and the refrigerant is dispersed by rotating fan blades 15 upon entry into the motor to form a substantially equally distributed refrigerant vapor cloud at opposite ends of the rotor. The refrigerant vapor then flows through axially extending ducts within the motor, i.e., through triangular apertures 16 in the stator teeth, air gap 17 formed between the rotor and stator 13, and passages 18 extending axially through the juxtaposed rotor laminations, before being exhausted radially through orifice 19 at the axial center of the motor. Desirably, the refrigerant enters the motor at the refrigerant boiling point and is discharged with an increased enthalpy and a substantially unchanged temperature as is more fully described in my copending U.S. Pat. application, Ser. No. 103,497, entitled High Efficiency Hermetically Sealed Dynamoelectric Machine, filed Jan. 4, 1971, (the entire disclosure of which patent application is specifically incorporated herein by reference).

Rotor 11 preferred for utilization in this invention is formed of a plurality of juxtaposed main rotor laminations 20, illustrated more clearly in FIG. 2 in a shaved state (i.e., with the peripheral edge of the lamination utilized during casting removed), having a central aperture 21 with a keyway 22 notched therein for mounting the laminations in axial registration upon rotor shaft 23. A plurality of circular apertures 24 are disposed at arcuately spaced apart locations along magnetic yoke 25 of the main rotor laminations to provide axial passages 18 extending completely through the rotor. Desirably, apertures 24 are disposed at an outboard location relative to the radial center of yoke 25 to maximize cooling of the rotor conductors situated within slots 26.

To produce the desired starting and operating characteristics for the motor, rotor slots 26 within the main rotor lamination are punched in a conventional triple cage configuration, i.e., a configuration having a substantially triangularly shaped upper region 27 separated from radially elongated body 28 of the slot by a constricted neck region 29. Such triple cage configurations customarily are utilized in squirrel cage induction motors to induce high current density in the portion of the rotor conductors situated in upper region 27 during initial energization of the motor to obtain high starting torque with the current density at synchronous speed becoming substantially equally distributed along the radial length of rotor conductors to produce the desired running characteristics for the motor. Typically, triangularly shaped upper regions 27 have inverted V-shaped legs symmetrically disposed at a 45° angle (as shown in G.B. Dunn, Jr. U.S. Pat. No. 2,794,138) relative to a radius of the rotor lamination bisecting the slot and may extend to a width of approximately 0.45 inch at the radially inward extremity of the region whereupon the slot constricts to a neck region having a width of approximately 0.2 inch and a radial length of approximately 0.2 inch. The sidewalls of slot 26 then branch tengentially outward (typically to a width greater than the width of the base of triangular region 27, e.g., to a width of approximately 0.5 inch) with the slot edges subsequently tapering inwardly over a radial span of approximately 1.2 inch to provide a constant width magnetic strip 30 between adjacent conductor slots. The dimension of the rotor slots, however, can be varied in accordance with well known principles to obtain motor characteristics suitable for any particular utilization.

To form radial venting ducts at the center of the rotor, venting laminations 33 (illustrated in FIG. 3 in their unshaved state, i.e., prior to trimming along line 3a subsequent to casting the rotor conductors), are juxtaposed with main rotor laminations 20 on both sides of the rotor centerline. The venting laminations, characteristically have coffin shaped conductor slots 34 with a triangularly shaped radially outer periphery geometrically identical to, and in registration with, the inverted V-shaped legs of triangular upper regions 27 of the main rotor laminations. The sidewalls of the conductor slots within the venting laminations, however, extend without interruption in a direction parallel to a radius bisecting strips 35 between conductor slots (i.e., parallel to the edges of main body 28 forming triple cage slots 26) before terminating at yoke 36 to provide a total conductor slot radial height equal to the total radial height of conductor slots 26 in main rotor laminations 20. Because there is no neck region in the coffin shaped conductor slots, the span between adjacent coffin shaped slots can be dimensioned greater than the span between the triple cage slots in the main rotor lamination without reducing the cross-sectional area of the conductor slots Thus, as can be seen more clearly in FIG. 4, notwithstanding the fact that the area and radial height of the conductor slots in the main rotor laminations and ventilating laminations are identical and the triangular upper regions of the triple cage slots and coffin shaped slots are in registration, use of coffin shaped slots in the ventilating laminations permit the edges of each coffin shaped slot to be spaced more closely than the edges of the triple cage slots thereby enhancing the span of magnetic material between adjacent coffin shaped slots. For example, for a typical 11 inch diameter main rotor lamination characterized by 40 triple cage conductor slots each having a total area of approximately 0.4 square inches and a total radial height of approximately 1.67 inch, a span of approximately 0.3 inch is obtained between adjacent slots while alteration of the shape of the triple cage slots to a coffin configuration of identical cross-sectional area provides a span of approximately 0.4 inch between adjacent slots.

Returning to the ventilating laminations of FIG. 3, transfer of the liquid refrigerant in a radial direction within ventilating laminations 33 is achieved by a plurality of radially extending venting slots 37 centrally situated between each coffin shaped conductor slot 34 and spaced therefrom by magnetic segments 38. The sidewalls of the venting slots preferably are disposed parallel to the sidewalls of the adjacent conductor slots to provide magnetic segments of constant width, desirably in excess of 1/16 inch, between the conductor and venting slots and the venting slots terminate at a radial location approximately one-half the radial height of the adjacent conductor slots.

A plurality of equally spaced kidney shaped manifolds 39 having a radial height equal to the diameter of circular apertures 24 serves to communicate liquid refrigerant flowing within apertures 24 with groups of venting slots 37 within lamination 33. Desirably, a span is provided within ventilating laminations 33 between adjacent kidney shaped manifolds to enhance the rigidity of the venting laminations while permitting some flux linkage in a radial direction through the laminations. In general, the total arcuate length of the kidney shaped manifolds within venting lamination 33 preferably is equal to $(360°/N) + D$ wherein N is the number of kidney shaped manifolds in the lamination, and D is the diameter of circular apertures 24 forming axial passage 18, and adjacent manifolds are separated by a magnetic span having an arc defined by the formula

S = (360°/N) − D

As can be seen in FIG. 3, kidney shaped manifolds 39 are not symmetrically disposed relative to the ventilating lamination diameter, identified by reference numeral 32, bisecting keyway 22 but rather are positioned to extend beyond the diameter by a span equal to the radius of circular apertures 24. Thus, by reversing the disposition of stacked venting laminations 33 situated on opposite sides of the rotor center, refrigerant flow through arcuately different sections of the rotor can be achieved without the utilization of diversely punched ventilating laminations (as will be explained more fully hereinafter). Desirably, each end of the kidney shaped manifold is semicircular having a radius identical to the radius of circular apertures 24 and the manifold extends over an arc to axially register both ends of the manifold with adjacent circular apertures forming axial passages 18.

Communication between venting slots 37 and air gap 17 is provided by ventilating laminations 41, illustrated in FIG. 5 in an unshaved state prior to trimming along line 5a subsequent to casting the rotor conductors, centrally disposed along the axial length of rotor 11. Laminations 41 characteristically have coffin shaped conductor slots 42 geometrically identical to, and in registration with, conductor slots 34 in ventilating lamination 33. Venting passages 43, equal in width to venting slots 37, also are centrally disposed between, and separated from, the adjacent conductor slots of the laminations. Venting passages 43, however, are radially displaced relative to venting slots 37 and are disposed at a location such that the radially inward extremity of venting passages 43 overlap the radially outward extremities of venting slots 37 in juxtaposed ventilating laminations 33. Thus, refrigerant flowing axially through circular apertures 24 from opposite ends (or the same side) of rotor 11 is communicated through kidney shaped manifold 39 to radially extending venting slots 37 within ventilating laminations 33 whereupon the refrigerant is transmitted to air gap 17 through venting passages 43 in ventilating lamination 41 (after shaving the outer periphery of the lamination to expose the cast conductors and venting passages). Ventilating lamination 41 also has a plurality of circular apertures 44 disposed in registration with circular apertures 24 of the main rotor laminations to extend axial passage 18 completely through the rotor.

Desirably, sets of ventilating laminations 33 are disposed on the opposite sides of ventilating laminations 41 to permit refrigerant flowing in axially opposite directions through rotor aperture 24 to be vented to the air gap through a single group of centrally disposed ventilating laminations 41. To obtain uniform cooling of the rotor, however, the ventilating laminations 33 on opposite sides of lamination 41 are reversed relative to each other with only the ends of kidney shaped manifolds 39 registered with circular apertures 24 being in communication. Thus, as can be seen more clearly in FIG. 6, kidney shaped manifold 39 in ventilating lamination 33 on one side of center lamination 41 is arcuately displaced relative to the kidney shaped manifold 39a in venting lamination 33 on the other side of venting lamination 41 by an amount equal to the arcuate span of the kidney shaped manifold minus the diameter of circular aperture 24. Through flow of refrigerant from opposite ends of the rotor therefore occurs in diverse arcuate sections on opposite sides of center laminations 41 and highly uniform cooling of the rotor is achieved.

While the venting laminations of this invention are illustrated as being situated at the center of the rotor, the radial venting passages can be placed anywhere along the length of the rotor, if desired. In general, the axial position of the radial venting passages is determined by such factors as the measured location of hot spots within the rotor, the length of the rotor core, and the percentage of cooling produced by auxiliary cooling techniques, i.e., cooling produced by refrigerant flow through the stator. Because refrigerant flowing radially from the venting passages in the rotor also assists in cooling the stator, the location of the radial rotor ducts may be determined by an requirement to cool a selected stator location.

In forming rotor 11, approximately forty unshaved ventilating laminations 41, each having a thickness of approximately 0.02 inch are positioned at the axial center of the rotor and forty unshaved venting laminations 33 of equal thickness are juxtaposed on either side of laminations 41. As previously explained, the disposition of ventilating laminations 33 are reversed on opposite sides of center laminations 41 to provide the desired arcuate displacement of kidney shaped manifolds 39 along the rotor. Main rotor laminations 20 in their unshaved state then are stacked on opposite sides of the ventilating laminations and blind punchings, i.e., punchings having preformed knockouts situated in registration with circular apertures 24, are disposed at spaced apart locations along both ends of the rotor to inhibit metal flow through apertures 24 during casting of the rotor bars. After the stack is pressed and the bore welded to maintain the laminations in a compressed state, rotor bars 46, end ring 47 and fan blades 15 are cast using conventional pressure or centrifugal methods. Leakage of molten aluminum from the conductor slots into the adjacent venting slots within the ventilating laminations, however, is prevented during casting by the substantial area, i.e., in excess of 1/16 inch, of magnetic material between the conductor and venting slots. Subsequent to casting, the rotor is shaved in a lathe to expose the venting slots in laminations 41 with or without exposing the surface of the cast conductors. The knockouts within the blind laminations then are punched out to communicate axial passages 18 with the ends of the rotor to permit refrigerant flow therethrough.

What I claim as new and desire to secure by Letters Patent of the United States is:

1. A rotor for a dynamoelectric machine comprising an axial shaft, a plurality of magnetic laminations stacked upon said shaft, said magnetic laminations having arcuately spaced slots along the periphery of said lamination to receive axially extending conductors therein, and venting means disposed along the axial length of said rotor to permit flow of coolant through said rotor, said venting means being characterized by an axial channel extending through said rotor laminations at a location radially interior of said conductor slots and at least one magnetic lamination having venting slots in communication with said axial channel, said venting slots extending radially between and being physically separated from the conductor slots within the venting lamination, said venting slots in said venting lamination terminating short of the periphery of said rotor, said venting lamination being juxtaposed with a second venting lamination having venting passages extending radially between and being physically separated from the conductor slots within said second venting lamination, said venting passages in said second venting lamination being radially displaced relative to the venting passages in the first venting lamination by an amount to partially overlap the venting passages in said first venting lamination.

2. A rotor for dynamoelectric machine according to Claim 1 wherein the geometric configuration of said conductor slots in the venting laminations differs from the geometric configuration of the conductor slots in the non-venting laminations forming the rotor to provide a greater span of magnetic material between adjacent slots of the venting laminations relative to the span of magnetic material adjacent the conductor slots in the non-venting laminations.

3. A rotor for a dynamoelectric machine according to claim 2 wherein the cross-sectional area of the conductor slots in the venting laminations is equal to the cross-sectional area of the conductor slots in the non-venting laminations.

4. In a rotor for a dynamoelectric machine characterized by an axial shaft, a plurality of main magnetic laminations stacked upon said shaft, each of said main magnetic laminations having arcuately displaced slots disposed along the periphery of said laminations to receive axially extending conductors therein, and ventilating laminations situated along the axial length of said rotor for passage of a coolant therethrough, the improvement comprising ventilating laminations characterized by conductor slots in axial registration with the conductor slots in said main rotor laminations, the cross-sectional area of said conductor slots in said ventilating laminations being equal in cross-sectional area to the conductor slots in the main rotor laminations, said main rotor conductor slots having a geometric configuration differing from the geometrical configuration of said conductor slots in said ventilating laminations to provide a greater span of magnetic material between adjacent slots of said ventilating laminations relative to the span of magnetic material between adjacent conductor slots in said main rotor laminations, and venting passages extending between and being physically separated from the conductor slots in said ventilating laminations.

5. A rotor for a dynamoelectric machine according to claim 4 wherein the radial height of said conductor slots in said ventilating laminations is equal to the height of the slots in said main rotor laminations.

6. A rotor for a dynamoelectric machine according to claim 5 wherein the conductor slots in said ventilating laminations and said main rotor laminations have triangularly shaped peripheral regions of identical geometric configuration, the edges of said triangularly shaped regions being axially aligned within said rotor.

7. A rotor for a dynamoelectric machine according to claim 4 wherein the venting passage in said ventilating laminations terminate short of the periphery of said rotor, said ventilating laminations being juxtaposed with second ventilating laminations having venting passages extending radially between and separated from the conductor slots within said second ventilating laminations, said venting passages in said second ventilating laminations being radially displaced relative to said venting passages in said first ventilating laminations by an amount to partially overlap the venting passages in said first ventilating laminations.

8. A rotor for a dynamoelectric machine according to claim 7 wherein said conductor slots in said main rotor lamination are triple cage slots and said conductor slots in said ventilating laminations are coffin shaped slots.

9. In a rotor of dynamoelectric machine characterized by an axial shaft, a plurality of main magnetic laminations stacked upon said shaft, each of said main magnetic laminations having arcuately displaced slots disposed along the periphery of said laminations to receive axially extending conductors therein, and ventilating laminations situated along the axial length of said rotor for passage of a coolant therethrough, the improvement comprising ventilating laminations characterized by conductor slots in axial registration with the conductor slots in said main rotor laminations, the conductor slots in the main rotor laminations having a geometric configuration differing from the geometric configuration of said conductor slots in said ventilating laminations to provide a greater span of magnetic material between adjacent slots in said ventilating laminations relative to the span of magnetic material between adjacent conductor slots in the main rotor laminations, venting passages extending between and being physically separated from the conductor slots in said ventilating laminations, at least one axial passage extending through said stacked main magnetic laminations to permit passage of refrigerant from the ends of said rotor to said venting passages, arcuately elongated manifolds interconnecting groups of said venting passages with said axial passage to permit a single axial passage having a relatively short arcuate span to feed refrigerant to a group of venting passages extending over a greater arcuate span, the arcuately elongated manifolds in ventilating laminations on one axial side of the rotor being arcuately displaced relative to the arcuately elongated manifolds in ventilating laminations on the other side of the rotor to feed refrigerant to arcuately displaced groups of venting passages.

10. A rotor for dynamoelectric machine according to claim 9 wherein said venting passages in the ventilating laminations terminate short of the periphery of said rotor and said ventilating laminations are juxtaposed with a second ventilating lamination having venting passages extending radially between and being physically separated from the conductor slots within said second ventilating lamination, said venting passages in said second ventilating lamination being radially displaced relative to the venting passages in the first ventilating lamination by an amount to partially overlap the venting passages in said first ventilating lamination.

11. A rotor for a dynamoelectric machine according to claim 10 wherein said axial passage extends completely through said rotor, a portion of the arcuately displaced manifolds on axially opposite sides of said rotor lying within the plane of said axial passage.

* * * * *